(12) United States Patent
Saluja et al.

(10) Patent No.: US 12,475,264 B2
(45) Date of Patent: Nov. 18, 2025

(54) SECURE RECOVERY KEY MANAGEMENT FOR REMOVABLE DRIVE ENCRYPTION ENFORCEMENT

(71) Applicant: Omnissa, LLC, Mountain View, CA (US)

(72) Inventors: Neeraj Saluja, Round Rock, TX (US); Evgeniy Sayapin, Austin, TX (US); Kevin Sheehan, Bloomfield, CT (US); Shravan Shantharam, Cumming, GA (US)

(73) Assignee: Omnissa, LLC, Mountain View, CA (US)

( * ) Notice: Subject to any disclaimer, the term of this patent is extended or adjusted under 35 U.S.C. 154(b) by 165 days.

(21) Appl. No.: 17/316,294

(22) Filed: May 10, 2021

(65) Prior Publication Data
US 2022/0358251 A1    Nov. 10, 2022

(51) Int. Cl.
G06F 21/78      (2013.01)
G06F 9/451      (2018.01)
G06F 21/10      (2013.01)
G06F 21/31      (2013.01)
G06F 21/60      (2013.01)

(52) U.S. Cl.
CPC .............. G06F 21/78 (2013.01); G06F 9/451 (2018.02); G06F 21/31 (2013.01); G06F 21/602 (2013.01); *G06F 21/107* (2023.08)

(58) Field of Classification Search
CPC .......... G06F 21/78; G06F 9/451; G06F 21/31; G06F 21/602; G06F 2221/0753; G06F 21/107; G06F 21/6209; H04L 9/0894
See application file for complete search history.

(56) References Cited

U.S. PATENT DOCUMENTS

| | | | |
|---|---|---|---|
| 7,610,491 B1* | 10/2009 | Tsao | G06F 21/31 713/184 |
| 7,926,092 B2* | 4/2011 | Abujbara | H04W 12/50 726/5 |
| 9,369,289 B1* | 6/2016 | Harrison | H04L 63/0876 |
| 10,148,429 B2* | 12/2018 | Balakrishnan | G06F 11/1402 |
| 2008/0065882 A1* | 3/2008 | Goodman | G06F 21/78 713/165 |
| 2010/0266132 A1* | 10/2010 | Bablani | H04W 12/128 380/286 |
| 2012/0036370 A1* | 2/2012 | Lim | G06F 21/602 713/189 |
| 2013/0148810 A1* | 6/2013 | Goel | H04L 9/0891 380/278 |
| 2013/0212367 A1* | 8/2013 | Ingalls | G06F 21/88 726/1 |
| 2015/0270956 A1* | 9/2015 | Basmov | G06F 21/74 713/189 |

(Continued)

*Primary Examiner* — Abu S Sholeman
(74) *Attorney, Agent, or Firm* — Kim & Stewart LLP

(57) ABSTRACT

A management service manages recovery keys. The management service receives a removable drive recovery key, a recovery key identifier, and a removable drive identifier from a management agent executed on a client device. The management service stores the information, reads the removable drive recovery key from the removable drive recovery key escrow, and transmits this to the management agent as a verification of accurate storage of the removable drive recovery key within the removable drive recovery key escrow.

20 Claims, 6 Drawing Sheets

(56) References Cited

U.S. PATENT DOCUMENTS

| | | | |
|---|---|---|---|
| 2017/0085386 A1* | 3/2017 | Susan | H04L 9/14 |
| 2017/0149561 A1* | 5/2017 | Bußer | H04L 9/0643 |
| 2017/0257214 A1* | 9/2017 | Stufflebeam | H04L 63/20 |
| 2019/0013942 A1* | 1/2019 | Brown | H04L 9/3226 |
| 2020/0344054 A1* | 10/2020 | Xuan | H04L 9/0894 |
| 2021/0200881 A1* | 7/2021 | Joshi | G06F 21/6218 |
| 2022/0329413 A1* | 10/2022 | Schindewolf | G06F 21/6218 |

* cited by examiner

SECURE RECOVERY KEY MANAGEMENT FOR REMOVABLE DRIVE ENCRYPTION ENFORCEMENT

BACKGROUND

Mobile devices are being used for access to enterprise computing systems and resources with greater frequency. With the growing number of different mobile devices, platforms, and operating systems available for adoption by users, various challenges can arise in the management of the mobile devices. Access to the capabilities of a mobile device can be managed through the administration of the suite of applications based on a set of management policies, compliance rules, and configuration data which is defined and enforced by the management service.

The proliferation of tablet and smartphone devices, for example, has resulted in several companies and organizations allowing employees to bring their own devices to work. The use of these personal devices can be associated with productivity gains and cost savings. The concept "bring your own device" (BYOD) for access to enterprise computing systems may have met initial resistance due to security concerns, but more and more companies are now looking to incorporate BYOD policies.

Drive or volume encryption can be part of the enterprise information security strategy for organizations. Enterprises can enforce volume encryption technologies to enforce operating system and disk drive encryption to ensure their assets and intellectual property remain secure. However, problems can arise for BYOD implementations and situations where workers bring work devices out of the company intranet or private local area network. Existing technologies can fail to operate properly when a removable drive is connected to a client device that is not networked through an enterprise's intranet or private local area network. For example, where recovery keys are stored in a domain system of record, a recovery key for a newly connected drive will be unknown to the enterprise, leaving the drive contents potentially lost if a password is forgotten. Further, when a password is forgotten, a user of the client device may be unable to retrieve a recovery key unless connected to an enterprise's local area network or private network. As a result, there is a need for better enforcement of removable drive encryption policies and recovery key management.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to secure recovery key management for removable drive encryption policy enforcement. As noted above, drive encryption can be part of an enterprise information security strategy for organizations. Drive encryption can include encryption of data volumes maintained by an operating system to access a removable or fixed drive. Enterprises can enforce volume encryption technologies to enforce volume encryption to ensure their assets and intellectual property remain secure. However, problems can arise for implementation of volume encryption for removable drives. Issues can also arise for BYOD implementations, where workers bring work devices out of the company intranet or private local area network. Existing technologies can fail to operate properly when a removable drive is connected to a client device that is not networked through an enterprise's intranet or private local area network. Where recovery keys are stored in a domain system of record, a recovery key for a newly connected removable drive will be unknown to the enterprise, leaving the drive contents potentially lost if a password is forgotten. Further, when a password is forgotten, a user of the client device may be unable to retrieve a recovery key.

Further, in enterprise settings, removable drives can be used with a number of different public or enterprise workstations as well as in areas with persons who would be unauthorized to access the removable drive. The removable drive's recovery key might be exposed to security risks such as being printed to a public or enterprise printer, written on paper that is left behind, or saved to a public or enterprise client device if the operating system's standard encryption and recovery process is followed. However, the present disclosure describes mechanisms that can provide secure removable drive encryption policy enforcement and recovery key management.

Figure 1:
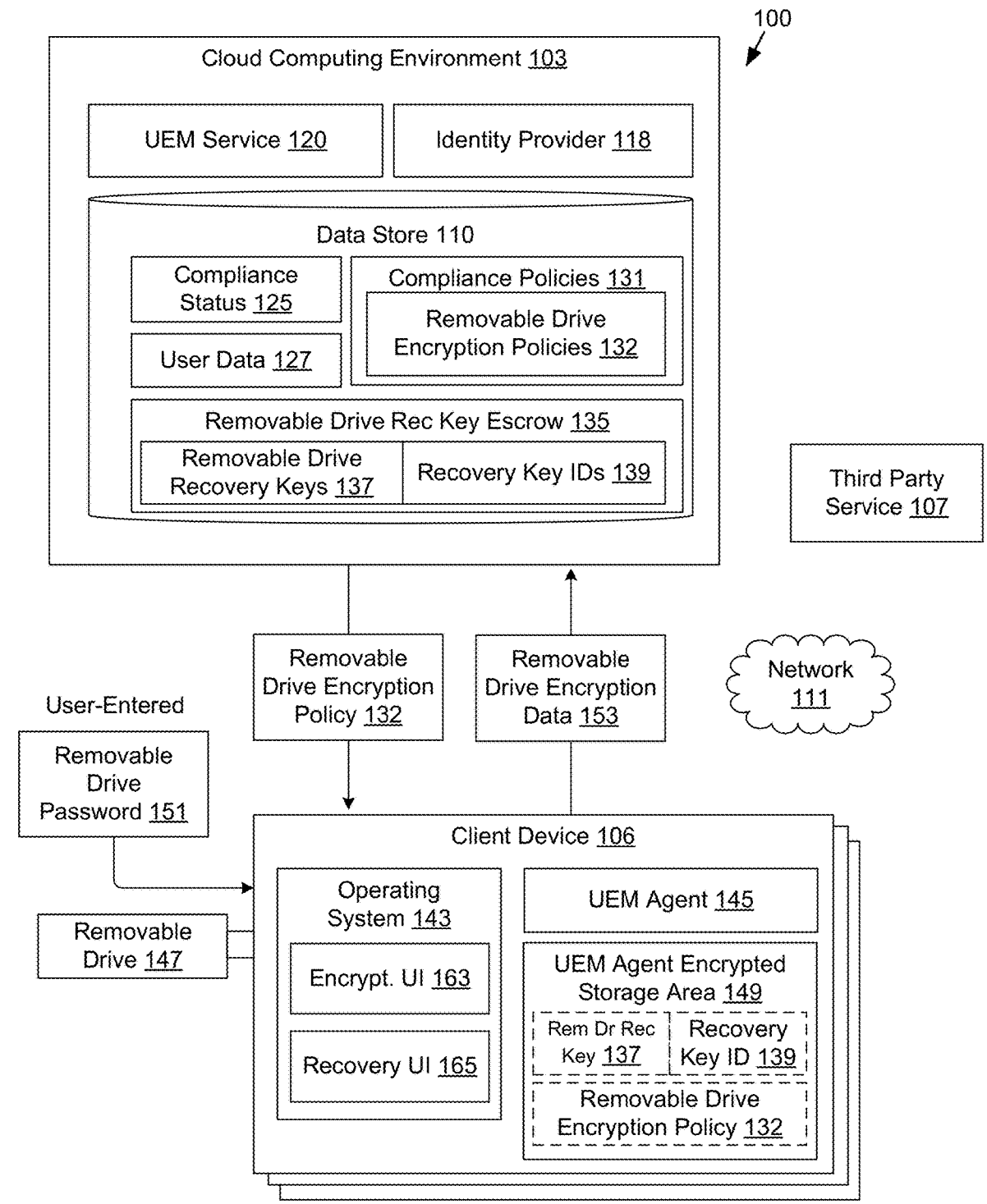
FIG. 1 illustrates an example networked environment that includes components that provide secure recovery key management for removable drive encryption enforcement, according to various examples described herein.

FIG. 1 illustrates an example networked environment 100 that includes components that provide secure recovery key management for removable drive encryption enforcement according to various examples described herein. The networked environment 100 includes a cloud computing environment 103, several client devices 106, and a third party service 107 in communication through a network 111. One or more removable drives 147 can be connected to the various client devices 106.

The cloud computing environment 103 can be embodied as one or more computers, computing devices, or computing systems. In certain embodiments, the cloud computing environment 103 can include one or more computing devices arranged, for example, in one or more server or computer banks. The computing device or devices can be located at a single installation site or distributed among different geographical locations. The cloud computing environment 103 can include a plurality of computing devices that together embody a hosted computing resource, a grid computing resource, or other distributed computing arrangements. In some cases, the cloud computing environment 103 can be embodied as an elastic computing resource where an allotted capacity of processing, network, storage, or other computing-related resources varies over time. As further described below, the cloud computing environment 103 can also be embodied, in part, as certain functional or logical (e.g., computer-readable instructions) elements or modules as described herein.

The cloud computing environment 103 can operate as an environment for mobile device management and unified endpoint management (UEM) UEM platforms that can manage the client devices 106, removable drives 147, and other devices and endpoints. In that context, the cloud computing environment 103 includes a data store 110. The cloud computing environment 103 can also execute a UEM service 120 and an identity provider 118. The data store 110 includes areas in memory for the storage of a compliance status 125, user data 127, compliance policies 131, removable drive encryption policies 132, and a removable drive recovery key escrow 135, among other types of data. The UEM service 120 can operate as a UEM platform that can manage client devices 106 that are enrolled as managed devices with the UEM service 120. The UEM service 120 and the removable drive recovery key escrow 135 can be accessible over a public wide area network (WAN) such as the Internet.

The removable drive recovery key escrow 135 can include a data structure such as a table or list of removable drive recovery keys 137. Each removable drive recovery key 137 can be linked in association with a corresponding recovery key identifier 139 and other information. For example, the removable drive recovery key escrow 135 can also be associated with a removable drive recovery key 137, with a username or another user identifier of a user account with the UEM service 120, an encryption time and date, a most recently seen time and date, a device identifier or device name of the removable drive 147, a capacity of the removable drive 147, a most recently connected client device 106 to which the removable drive 147 was connected, and other information obtained from removable drive encryption data 153 that the UEM agent 145 transmits to the UEM service 120. The user identifier can indicate an "owner" or "operator" of the removable drive 147.

The removable drive recovery key escrow 135 can be specific or exclusive to operating system recovery keys used as recovery keys for operating system-based encryption, such as BitLocker® recovery keys. The removable drive recovery key escrow 135 can be specific or exclusive to removable drive recovery keys 137 and can exclude recovery keys for client-device-specific or fixed drives. For fixed drives, the recovery keys can be escrowed in association with a client device object or otherwise in association with a device registration of a client device 106 in the data store 110. However, there is no expectation that a removable drive 147 is associated with a particular client device 106, even if the removable drive 147 is initially accessed and encrypted on that client device 106. The removable drive recovery key escrow 135 can be provided as a separate data structure that represents all removable drives 147 that are managed by the UEM service 120. The removable drive recovery key escrow 135 can be separate from a device object or registration of a particular client device 106. However, the event log can indicate client devices 106 where a removable drive 147 has been accessed, as well as the user account that was logged into the client device 106.

The operating system 143 can include Windows® 10, which can utilize BitLocker® for volume encryption. The UEM agent 145 can transmit removable volume encryption data 153 in response to various events, periodically, and according to a schedule. The operating system 143 can also include Linux®, MacOS®, and another operating systems that utilize other volume encryption services. The client device 106 can also use other volume encryption services such as VeraCrypt® and TrueCrypt®.

The UEM service 120 can also include a removable drive event log for removable drives 147. The removable drive event log can be part of the removable drive recovery key escrow 135 or can be maintained as a separate structure. The event log can log events such as encryptions, decryption requests, decryptions events, encryption key accesses, encryption key transmissions, and others.

The compliance status 125 can identify which rules or policies a client device 106 or a user account linked to the client device 106 has violated. For example, the client device 106 may have been taken outside of a specified geofence defined for the client device 106. As another example, the client device 106 may have an unencrypted removable drive 147 connected.

User data 127 represents information about users who have user accounts in the enterprise. These users can also have one or more client devices 106 that are enrolled as managed devices with the UEM service 120. User data 127 can include authentication data, and information about third party services with which the user is assigned an account.

The removable drive 147 can include a removable memory connected through a bus of the client device 106 in a removable manner. The removable drive 147 can include a universal serial bus (USB) drive connected to the client device 106 using a USB connector, a firewire drive connected to the client device 106 using a firewire connector, a thunderbolt-based drive, or another type of drive connected using a connector that conforms to another interconnection standard. The removable drive 147 can connect to a bus that transfers data between components of the client device 106. The bus can include all related hardware components that facilitate data transfer between components, including wired connections, optical fiber connections, conversion components, and others. The removable drive 147 can correspond to a drive type or classification of drives that is recognized by the operating system 143 as a removable drive 147 rather than as a fixed drive. For example, the removable drives 147 can include SD cards, flash cards, flash drives, and other drives.

The operating system 143, or another volume encryption service, can obtain a volume encryption password, encrypt the fixed drive 147, and generate a removable drive recovery key 137 that is uniquely associated with a removable drive 147. However, the removable drive recovery key 137 is not necessarily static, so a removable drive 147 that is re-encrypted is not limited to the same removable drive recovery key 137 for each encryption event. A removable drive recovery key 137 can include a unique numerical, alphanumerical, or any character-based password that can be used to unlock access to the removable drive 147 if the operating system 143 or its encryption instructions are unable to confirm that access is authorized. In one example, the removable drive recovery key 137 can include a unique 48-digit numerical key. This removable drive recovery key 137 can be saved as a file or printed if the standard encryption process of the operating system 143 is using the encryption user interface 163. For example, the encryption user interface 163 can present a user with the option to view, print, or save the file to a user-selected location to which the user has access in the client device 106. The recovery user interface 165 can refer to a user interface through which a user can direct a standard recovery process to recover access to the removable drive 147.

The recovery key identifier 139 can be used in order to identify a removable drive recovery key 137. The recovery key identifier 139 can include a unique numerical, alphanumerical, or any character-based password that can be mapped to the removable drive recovery key 137. For example, an 8 digit numerical key, or a 32 digit alphanumerical key. The recovery key identifier 139 can include or be generated using a hardware address of the removable drive 147. The removable drive password 151 can refer to a user-entered password or an automatically-generated password, which can include a numerical, alphanumerical, or any character-based password.

The removable drive encryption policy 132 can specify drive encryption parameters including a recovery type, drive encryption method or algorithm, cipher strength or number of characters, and other parameters. The recovery type can include a recovery key identifier recovery type, and can specify that the recovery key identifier 139 be written to an encrypted data location such as the UEM agent encrypted storage area 149. The UEM agent 145 can have access to the UEM agent encrypted storage area 149. The UEM agent 145 can also operate in a privileged mode under the system account, so that users do not have access to the contents of the UEM agent encrypted storage area 149.

The drive encryption parameters can also specify that the removable drive recovery key 137 be written to the UEM agent encrypted storage area 149. The UEM agent 145 can transmit a drive encryption command 149 that causes the operating system 143 or other instructions or applications executed on the client device 106 to encrypt the removable drive 147 according to the removable drive encryption policy 132. The removable drive password 151 can be entered or generated to conform to specified drive encryption parameters for the removable drive 147.

The UEM service 120 can enroll several client devices 106 for mobile device management services. To begin enrollment, the UEM service 120 can identify and authenticate one of the client devices 106 and store data related to the client device 106 for later reference. In some cases, the UEM service 120 (or a UEM agent 145, an application, or a component executing on the client device 106) can also be registered as a device administrator (at least in part) of the client device 106, permitting the UEM service 120 to configure and manage certain operating aspects of the client device 106.

Once the client device 106 is enrolled for device management by the UEM service 120, the UEM service 120 can direct the installation of various software components or applications on the client device 106. The software components can be configured on the client device 106 at the direction of the UEM service 120. Such software components can include, for example, applications, resources, libraries, and other related components.

The UEM service 120 can transmit compliance policies 131, compliance rules, and configuration data for execution by and/or enforcement on the client device 106. In that context, during or after enrollment, the UEM service 120 can retrieve or generate a set of management policies, compliance rules, and configuration data for the client device 106 and transfer those policies, rules, and data to the client device 106 for reference by the operating system 143 and certain applications executing on the client device 106.

The UEM service 120 can also provide a management console as an engine and console interface for device management of the client devices 106. An information technology administrator or user, for example, can view, administer, and update the management policies, compliance rules, and configuration data on the client devices 106 using the management console. The policies, rules, and configuration data can be collectively administered for several of the client devices 106 by organizing the client devices 106 into several different groups or categories of devices according to organizational or other factors or considerations.

The UEM service 120 can ensure compliance of the client device 106 in conjunction with the UEM agent 145 and other instructions executed by the cloud computing environment 103 and the client device 106. For example, the UEM service 120 can transmit the removable drive encryption policy 132 to the UEM agent 145 for enforcement.

The UEM agent 145 can also determine that a removable drive 147 is unencrypted by an encryption type specified in the removable drive encryption policy 132. The encryption type can include a particular encryption algorithm as well as the operating-system-based or other volume encryption service that implements volume encryption for removable drives 147. The UEM agent 145 can enforce the removable drive encryption policy 132 by directing encryption of the removable drive 147 using a volume encryption service such as BitLocker® and others. In some cases, the encryption service an lack a native ability to use a cloud-based removable drive recovery key escrow 135. While recovery keys can be stored in an enterprise active directory account, this can be inaccessible to the client device 106 based on permissions, or based on the network location of the client device. For example, the enterprise active directory account can be inaccessible unless connected to a private LAN. However, the mechanisms described herein provide secure cloud-based removable drive key management through a UEM service 120 that is unaffiliated with the operating system 143. The UEM service 120 and removable drive recovery key escrow 135 can be accessible to the client device 106 through a public LAN, public WAN, and the Internet.

The identity provider 118 can provide single sign-on or identity management capabilities for an enterprise. The identity provider 118 can allow users to authenticate his or her identity to obtain an authentication token that can be provided to a third party service 107. The identity provider 118 can utilize OAuth, security assertion mark-up language (SAML), or other single sign-on methodologies. The identity provider 118 and UEM service 120 can communicate so that the UEM service 120 can revoke or authorize access to various services for users in the enterprise based on status of a client device 106 assigned to the user. The identity provider 118 can also rely on user data 127 in the data store 110. In some examples, the identity provider 118 can rely upon a separate source of user data in a separate data store.

The third party service 107 can be embodied as one or more computers, computing devices, or computing systems. Like the cloud computing environment 103, the third party service 107 can include one or more computing devices arranged, for example, in one or more server or computer banks. The computing device or devices can be located at a single installation site or distributed among different geographical locations. The third party service 107 can include a plurality of computing devices that together embody a hosted computing resource, a grid computing resource, or other distributed computing arrangement. The third party service 107 can also be embodied, in part, as certain functional or logical (e.g., computer-readable instructions) elements or modules as described herein.

The third party service 107 can be a third party service provided by an enterprise to its users. The third party service 107 can federate its authentication for users of the enterprise to the identity provider 118. The third party service 107 can be a cloud-based storage service, recovery key escrow service, or other system for which the identity provider 118 can authenticate access by users of the enterprise. The third party service 107 can be accessible over the Internet or another public WAN. In some cases, the UEM service 120 can access a removable drive recovery key escrow 135 that is stored and maintained using functions exposed by the third party service 107. For example, the UEM service 120 can use the identity provider to authenticate with the third party service 107 and can invoke an application programming interface (API), or a function of an API to store, modify, and retrieve removable drive recovery keys 137 stored on a data store 110 of the third party service 107.

For convenience, the UEM agent 145 is discussed as transmitting and receiving the removable drive recovery keys 137 with respect to the UEM service 120. However, the UEM service 120 can work in conjunction with the identity provider 118 and the third party service 107 to provide access to a removable drive recovery key escrow 135. In some examples, once authentication is completed by the UEM service 120 and the identity provider 118, the third party service 107 and the client device 106 can communicate directly. The UEM agent 145 can invoke the API or function of the third party service 107 to store, modify, and retrieve removable drive recovery keys 137 from the third party service 107. In other cases, the UEM service 120 can work as a pass-through, where the third party service 107 and can relay communications and/or removable drive recovery keys 137.

The client devices 106 are representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the UEM service 120 for device management. A UEM agent 145 can be installed on a client device 106 to locally manage the device on behalf of the remotely executed UEM service 120. The UEM agent 145 can be installed with elevated privileges or be effectuated through operating system APIs to manage the client device 106 on behalf of the UEM service 120. The UEM agent 145 can have the authority to manage data on the client device 106, install, remove, or disable certain applications, or install configuration profiles, such as VPN certificates, Wi-Fi profiles, email profiles, etc.

The UEM agent 145 can also have the authority to enable or disable certain hardware features of the client device 106 in certain instances. For example, the UEM agent 145 can communicate with the operating system of the client device 106 to disable access to the removable drive 147 unless it is encrypted according to a removable drive encryption policy 132. The UEM agent 145 can also place the device into different hardware modes, such as airplane mode, silent mode, do-not-disturb mode, or other modes supported by the client device 106.

The UEM agent 145 can alter operation of the client device 106 in response to commands or policies provided by the UEM service 120 to the client device 106. The UEM agent 145, in one instance, can poll the UEM service 120, or a command queue associated with the UEM service 120, to determine whether a management command intended for the client device 106 has been sent to the client device 106. In response to the command queue having a command for a client device 106, the UEM agent 145 can retrieve the command and execute the command on the client device 106. The command might instruct the UEM agent 145 to install a configuration profile, enforce a restriction or policy, or take other management actions on the client device 106. In one example, the UEM service 120 might detect that the client device 106 is out of compliance with respect to a compliance rule and might instruct the UEM agent 145 to restrict a hardware feature of the client device 106, delete data from the client device 106, or disable certain applications on the client device 106. The UEM agent 145 can also take other variations of management actions on the client device 106 as directed by the UEM service 120.

As part of the enrollment process, the UEM service 120 and/or UEM agent 145 can be registered as a device administrator of the client device 106, permitting the UEM service 120 and/or UEM agent 145 to manage certain operating aspects of the client device 106. The UEM agent 145 can operate at a privileged level associated with a system account of the operating system 143. The UEM service 120 can remotely configure the client device 106 by interacting with the UEM agent 145. The UEM service 120 can also transfer various software components to the client device 106, and those software components can be installed and/or configured on the client device 106 at the direction of the UEM agent 145. Such software components can include, for example, applications, resources, libraries, drivers, device configurations, or other related components. The UEM service 120 can also transfer various management policies, compliance rules, and configuration data for enforcement on the client device 106, and those policies, rules, and data can be stored on the client device 106 by the UEM agent 145. The UEM service 120 can then instruct the UEM agent 145 and the operating system of the client device 106 to enforce the management policies, compliance rules, and configuration data stored on the client device 106.

The network 111 can include the Internet, intranets, extranets, wide area networks (WANs), local area networks (LANs), wired networks, wireless networks, cable networks, satellite networks, other suitable networks, or any combinations thereof. As one example, the cloud computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the cloud computing environment 103, the third party service 107, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

Figure 2:
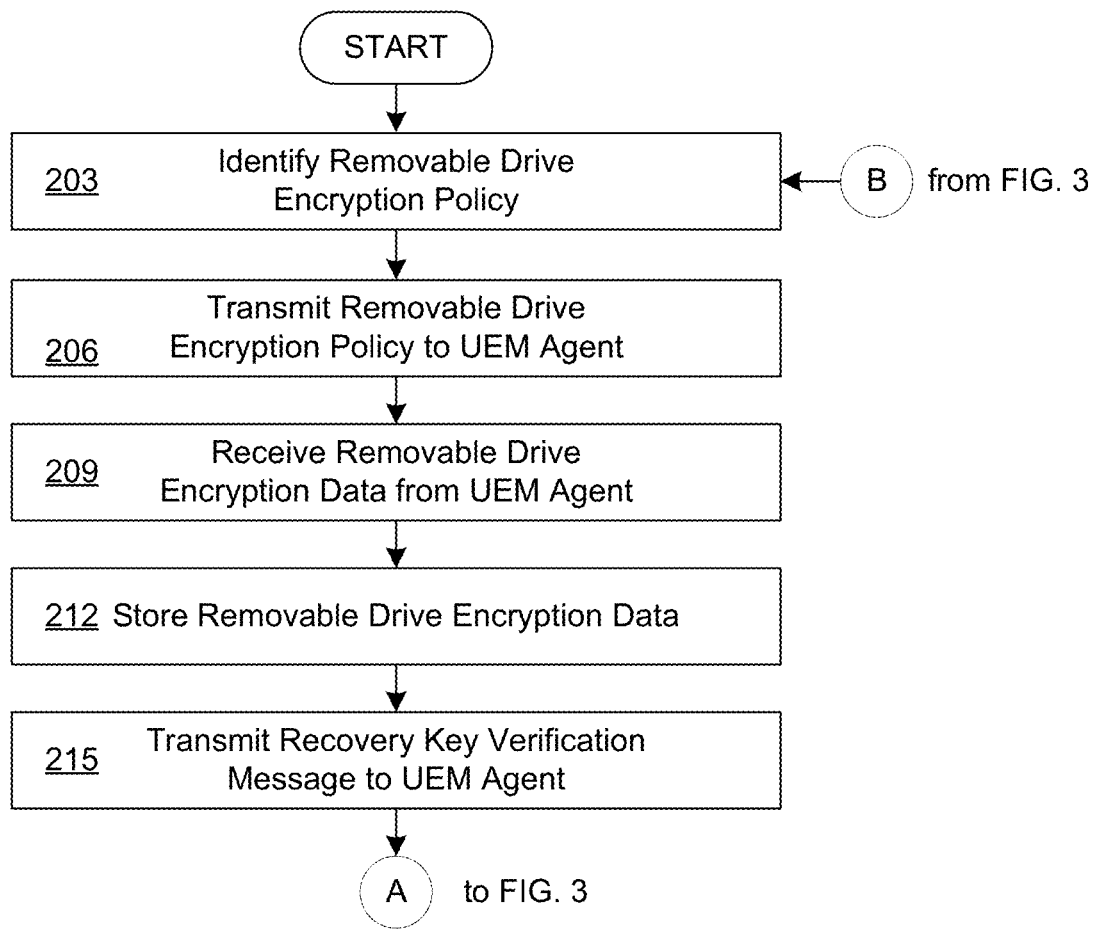
FIG. 2 illustrates a flowchart performed by components of the networked environment for secure recovery key management and removable drive encryption enforcement, according to various examples described herein.

FIG. 2 shows a flowchart performed by components of the networked environment 100. The flowchart illustrates how a UEM service 120 can interact with other components of the networked environment 100 to provide secure recovery key management for removable drive encryption policy enforcement. Generally, the flowchart shows how the UEM service 120 enforces a removable drive encryption policy 132, receives removable drive encryption data 153, and verifies accurate storage of the removable drive recovery key 137.

This enables the removable drive recovery key 137 to be generated and initially stored from any public network, rather than only from a private LAN of the enterprise that manages the client device 106. The process can also securely store the removable drive recovery keys 137 in a cloud-based removable drive recovery key escrow 135 in a manner that prevents user access to the removable drive recovery keys 137 prior to a recovery request. In some examples, recovery key escrow and removable drive recovery can proceed without any user from accessing the removable drive recovery key 137. However, if the key is accessed, an event log of the UEM service 120 or the removable drive recovery key escrow 135 can maintain a log of every user account or identifier that associated with recovery key access events.

In step 203, the UEM service 120 can identify a removable drive encryption policy 132. For example, the UEM service 120 can generate a console user interface. The console user interface can include user interface elements that allow an administrator or other users to design a removable drive encryption policy 132. The removable drive encryption policy 132 can include drive encryption parameters including a recovery type, drive encryption method or algorithm, cipher strength or number of characters, and other parameters. The removable drive encryption policy 132 can indicate that all removable drives 147 that are connected to enterprise client devices 106 are to be encrypted. The removable drive encryption policy 132 can specify that volume encryption is to be carried out using operating-system-based encryption or another specified volume encryption service. In other cases, the UEM service 120 can receive a removable drive encryption policy 132 from a network service or from a client device 106.

In step 206, the UEM service 120 can transmit the removable drive encryption policy 132 to a UEM agent 145 of a client device 106. While the discussion uses the singular for the UEM agent 145 and the client device 106, the removable drive encryption policy 132 can be applied to a logical group of client devices 106 using corresponding UEM agents 145. In some examples, the UEM service 120 can transmit the removable drive encryption policy 132 directly to a UEM agent 145. In other cases, the UEM service 120 can maintain a command queue for the UEM agent 145 and can place a command to install the removable drive encryption policy 132 in the command queue. The command can include the removable drive encryption policy 132 or a network location or URL where the UEM agent 145 can download the removable drive encryption policy 132. The UEM agent 145 can retrieve the command and download the removable drive encryption policy 132 that is transmitted from the UEM service 120.

The UEM agent 145 can install the removable drive encryption policy 132 and enforce it on the client device 106. A removable drive 147 that is connected to any client device 106 that includes the removable drive encryption policy 132 can be required to be encrypted in order to write to the removable drive 147. Otherwise, the UEM agent 145 can enforce the removable drive 147 to be used in read-only mode. The UEM agent 145 can identify removable drive encryption data 153 and can provide this information to the UEM service 120. The UEM agent 145 can also direct and override certain portions of the encryption and recovery process. Aspects of the UEM agent 145 are discussed in further detail with respect to FIGS. 4 and 5.

In step 209, the UEM service 120 can receive removable drive encryption data 153 from the UEM agent 145. The UEM agent 145 can transmit removable drive encryption data 153 in response to certain events associated with encryption, decryption, and access to encrypted removable drives 147. The events can include removable drive encryption, a removable drive access, a removable drive recovery request, receipt of a removable drive recovery key 137, successful access to a removable drive 147, and other events. The removable drive encryption data 153 can include a removable drive recovery key 137, a recovery key identifier 139, a user identifier of a user logged into the client device 106, an encryption time and date, a most recently seen time and date, a device identifier or device name of the removable drive 147, a capacity of the removable drive 147, an identifier of the client device 106 to which the removable drive 147 is connected, and other information.

In step 212, the UEM service 120 can store the removable drive encryption data 153. All or a subset of the removable drive encryption data 153 can be stored in the removable drive recovery key escrow 135. The removable drive recovery key escrow 135 can include a data structure such as a table or list of removable drive recovery keys 137 linked in association with other removable drive encryption data 153. The removable drive recovery key escrow 135 can be provided as a separate data structure that represents all removable drives 147 that are managed by the UEM service 120. The UEM service 120 can also maintain a removable drive event log that includes events associated with encryption, decryption, and access to encrypted removable drives 147. The events log can include removable drive encryption events, removable drive access events, a removable drive recovery requests, receipt events of a removable drive recovery keys, successful access to a removable drive 147, and other events.

In step 215, the UEM service 120 can transmit a recovery key verification message to the UEM agent 145. The recovery key verification message can include the removable drive recovery key 137. In this way, the UEM service 120 and the UEM agent 145 can verify that the removable drive recovery key 137 was successfully received and stored by the UEM service 120 prior to removal from the client device 106. In some cases, the UEM agent 145 transmits an indication that the received removable drive recovery key 137 matches the one stored in the client device 106, and an indication the removable drive recovery key 137 is deleted from the client device 106.

Removal of the removable drive recovery key 137 and other removable drive encryption data 153 from the client device 106 can be a security feature. Multiple users may access a client device 106, or the client device 106 can be a user's personal device and can be subject to loss. Further, there is no expectation that a removable drive 147 is associated with a particular client device 106, even if the removable drive 147 is initially accessed and encrypted on that client device 106. The recovery key verification message can include or be considered a command to delete the removable drive recovery key 137 from the client device 106 if the included removable drive recovery key 137 matches that stored on the client device 106.

Figure 3:
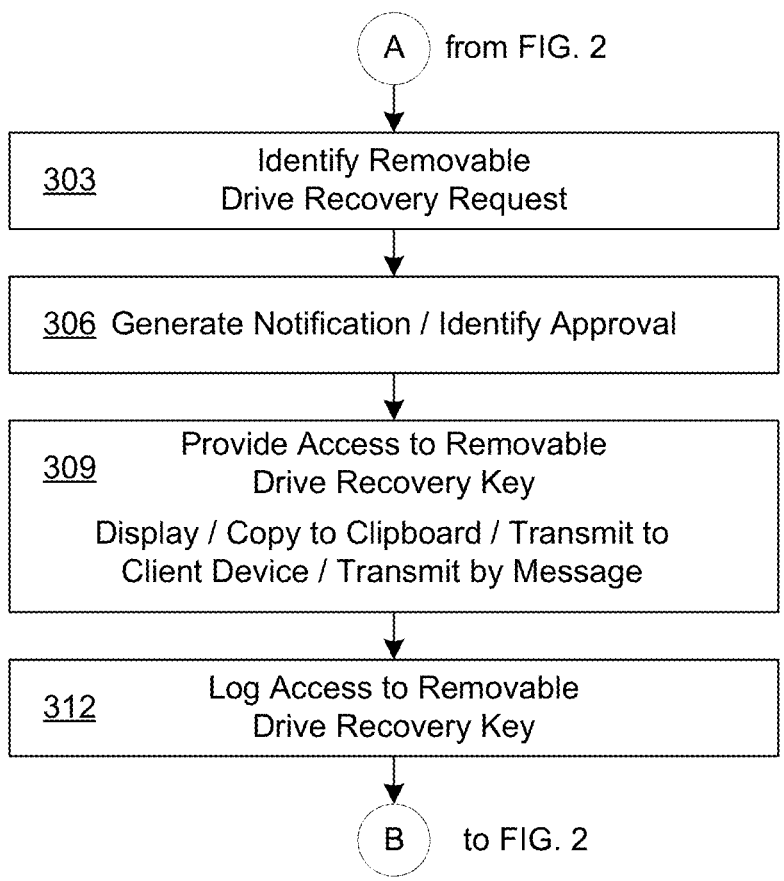
FIG. 3 illustrates another flowchart performed by components of the networked environment for secure recovery key management and removable drive encryption enforcement, according to various examples described herein.

FIG. 3 shows a flowchart performed by components of the networked environment 100. The flowchart illustrates how a UEM service 120 can interact with other components of the networked environment 100 to provide secure recovery key management for removable drive encryption policy enforcement. Generally, the flowchart shows how the UEM service 120 provides the removable drive recovery key 137 for a recovery process in the case of a lost or unknown removable drive password 151.

In step 303, the UEM service 120 can identify a removable drive recovery request. The UEM service 120 can identify a removable drive recovery request through the console user interface of the UEM service 120. In some cases, this can include an end user accessing a self-service portal provided by the UEM service 120. In other examples, the user can contact an administrator, and the administrator can log in with administrator credentials and initiate a removable drive recovery request. In further examples, the UEM service 120 can receive the removable drive recovery request from a UEM agent 145.

In step 306, the UEM service 120 can generate a notification and identify an administrator approval for the removable drive recovery request. The notification can include generating a notification user interface element within the console user interface of the UEM service 120. The notification can also include transmitting a message such as an email message, a messaging service message, a short message service (SMS) message, or another message to an administrative user. The notification can include removable drive encryption data 153 associated with the removable drive 147. In some cases, the notification can include a user interface element such as a button, URL, or another element to identify administrator approval. In some situations, approval can be identified automatically and without user interaction based on a compliance status of the client device 106, privileges and compliance associated with a user account, and other factors. Administrator-initiated removable drive recovery requests can omit notification and approval.

In step 309, the UEM service 120 can provide access to the removable drive recovery key 137. The UEM service 120 can generate a console user interface that facilitates access to a removable drive recovery key 137 for removable drive recovery. Removable drive recovery key 137 access can be provided in a number of ways. The console user interface can show information such as a removable drive name or identifier, a user identifier, a recover key identifier 139, and other removable drive encryption data 153. However, the console user interface can obscure the removable drive recovery key 137 to prevent inadvertent viewing in the console user interface. In order to view the removable drive recovery key 137 personally, an administrator or another user can select a user interface element that reveals the removable drive recovery key 137 in the console user interface.

The console user interface can also include a user interface element that when selected causes the UEM service 120 to transmit the removable drive recovery key 137 to a particular client device 106. The client device 106 can be associated with an owner or operator of the removable drive 147, or a user account that is logged into the console user interface, or a client device 106 selected from a list of client devices 106 that are associated with the removable drive 147. The console user interface can also include a user interface element that when selected causes the UEM service 120 to transmit the removable drive recovery key 137 within a message, such as to a particular email address, to a messaging service username, to a telephone number, or to another messaging endpoint associated with the operator of the removable drive 147.

The console user interface can also include a user interface element that when selected causes the UEM service 120 to copy the removable drive recovery key 137 to a clipboard of a client device 106 being used to access the console user interface of the UEM service 120. The console user interface can also include a user interface element that when selected causes the UEM service 120 to transmit the removable drive recovery key 137 to a UEM agent 145 of a client device 106 to which the removable drive 147 is currently connected according to the removable drive encryption data 153, or to a client device 106 that originated the removable drive recovery request. In some cases, the UEM service 120 can transmit the removable drive recovery key 137 to the end user or client device 106 while preventing the administrative user from viewing or accessing the removable drive recovery key 137. In other cases, the administrative user can be provided access to the removable drive recovery key 137 as part of the transmission process.

In step 312, the UEM service 120 can log access to the removable drive recovery key 137. The UEM service 120 can maintain a removable drive event log for removable drives 147. The removable drive event log can be part of the removable drive recovery key escrow 135 or can be maintained as a separate structure. The event log can log events such as encryptions, decryption requests, decryptions events, encryption key accesses, encryption key transmissions, and others. The console user interface can show the event log in a searchable and sortable manner. The UEM service 120 can update the event log to log the access to the removable drive recovery key 137. The UEM service 120 can indicate within the event log the type of access provided. The event log can also indicate the user account or accounts that are associated with the access to the removable drive recovery key 137.

Figure 4:
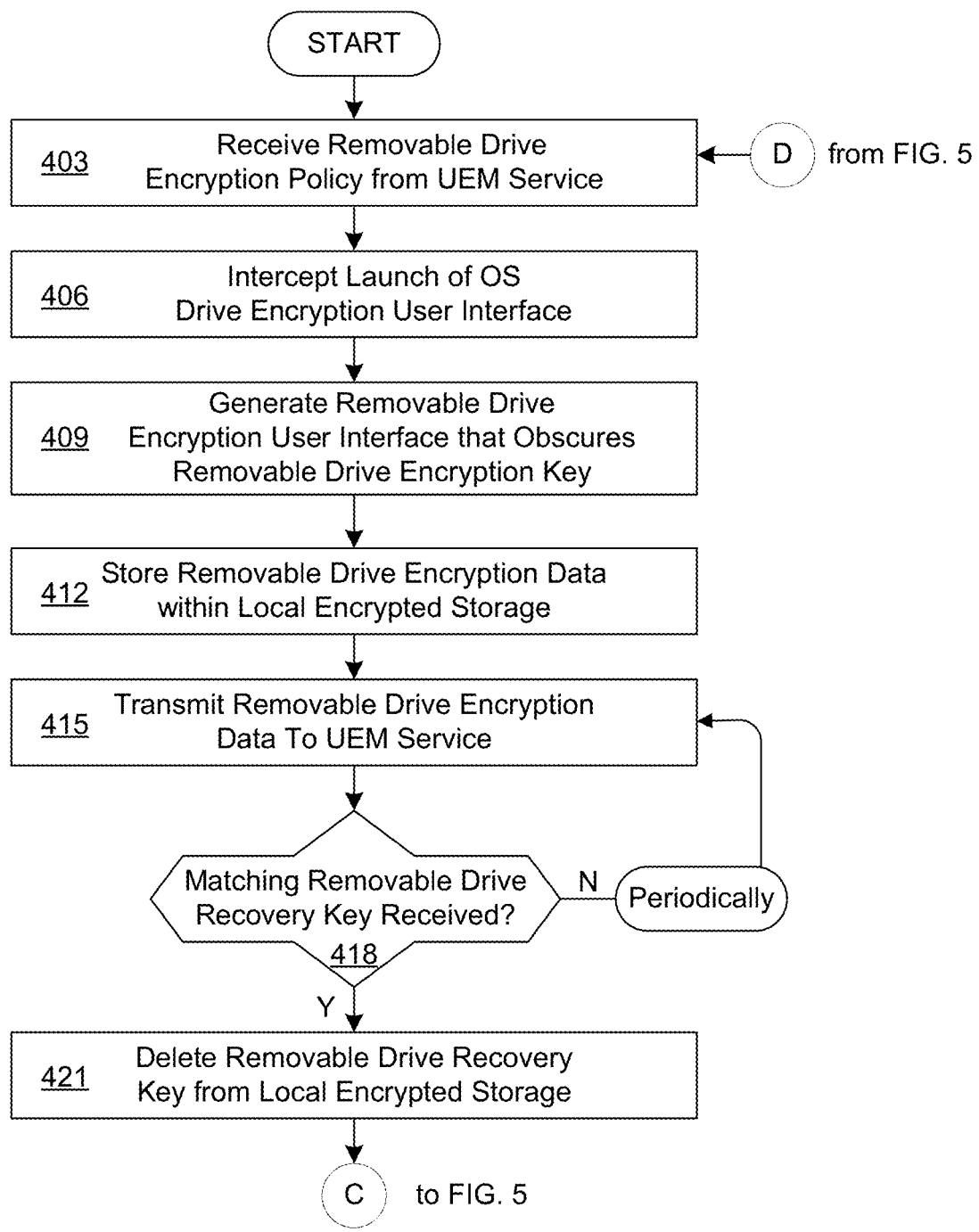
FIG. 4 illustrates another flowchart performed by components of the networked environment for secure recovery key management and removable drive encryption enforcement, according to various examples described herein.

FIG. 4 shows a flowchart performed by components of the networked environment 100. The flowchart illustrates how a UEM agent 145 can interact with other components of the networked environment 100 to provide secure recovery key management for removable drive encryption policy enforcement. Generally, the flowchart shows how the UEM agent 145 enforces a removable drive encryption policy 132, provides removable drive encryption data 153 to the UEM service 120 for escrow, and verifies accurate storage of the removable drive recovery key 137.

In step 403, the UEM agent 145 can receive a removable drive encryption policy from the UEM service 120. The UEM agent 145 can receive the removable drive encryption policy 132 directly from the UEM service 120. In other cases, the UEM agent 145 can retrieve a command to install the removable drive encryption policy 132 from a command queue maintained by the UEM service 120 for the UEM agent 1450 or the client device 106. The command can include the removable drive encryption policy 132 or a network location or URL where the UEM agent 145 can download the removable drive encryption policy 132. The UEM agent 145 can install the removable drive encryption policy 132 and enforce it on the client device 106.

The UEM agent 145 can require a removable drive 147 that is connected to the client device 106 to be encrypted in order to write to the removable drive 147, according to the removable drive encryption policy 132. Otherwise, if encryption is cancelled or declined, the UEM agent 145 can enforce the removable drive 147 to be used in read-only mode. The UEM agent 145 can identify removable drive encryption data 153 and can provide this information to the UEM service 120. The UEM agent 145 can also direct and override certain portions of the encryption and recovery process.

In step 406, the UEM agent 145 can intercept a launch of an operating system encryption user interface 163 or wizard. The removable drive encryption policy 132 can include instructions to intercept the operating system encryption user interface 163. The operating system encryption user interface 163 can present a user with the option to view, print, or save the file to a user-selected location to which the user has access in the client device 106. However, this standard encryption process and user interface can present security risks. For example, the operating system encryption user interface 163 can allow a user to be exposed to the removable drive recovery key 137. Users might write or print the removable drive recovery key 137 and leave it in an unsecured location, or lose the removable drive recovery key 137. If the user saves the removable drive recovery key 137 to an unencrypted storage of the client device 106, this can also pose a security risk.

In step 409, the UEM agent 145 can generate a removable drive encryption user interface that obscures the removable drive recovery key 137. In order to provide greater security, the UEM agent 145 can intercept the operating system encryption user interface 163 and replace it with its own removable drive encryption user interface that obscures the removable drive recovery key 137.

The UEM agent 145 can communicate with the operating system 143 to move forward with volume encryption of the removable drive 147. However, the process can be simplified from the user perspective. The UEM agent 145 can automatically use predetermined UEM-enforced settings according to the removable drive encryption policy 132 and without prompting user to provide these settings. For example, the UEM agent 145 can select configurations such as password usage, smart card usage, encrypt used space, encrypt entire drive, compatible mode, recovery type, drive encryption method or algorithm, cipher strength or number of characters, and other parameters.

The removable drive encryption user interface can generate a prompt or another user interface element through which a removable drive password 151 can be entered. The UEM agent 145 can direct the operating system based encryption process by generating commands and providing them to the operating system 143. The UEM agent 145 can transmit or pass the password to the operating system 143. Once the password is verified as acceptable in format, the operating system 143 can return the removable drive recovery key 137, the recovery key identifier 139, and other operating-system-generated removable drive encryption data 153 to the UEM agent 145. The UEM agent 145 can obscure and make the removable drive recovery key 137 inaccessible to the user. For example, the UEM agent 145 can prevent printing, displaying, and saving the removable drive recovery key 137 to an operating-system-affiliated account such as a MICROSOFT® account. The UEM agent 145 can also identify other removable drive encryption data 153 such as a user identifier, client device identifier, a drive name, a drive size, and other information.

In step 412, the UEM agent 145 can store the removable drive encryption data 153, including the removable drive recovery key 137, within the local encrypted storage on the client device 106. The UEM agent 145 can ensure that the removable drive recovery key 137 is obscured and inaccessible to the user. The UEM agent 145 can provide the user with the recovery key identifier 139 for recovery purposes. The drive name, user identifier, and other removable drive encryption data 153 can also be identified to the user for recovery purposes.

In some examples, once the removable drive encryption data 153 is stored locally, the UEM agent 145 can direct the operating system 143 to proceed with encryption. Alternatively, the removable drive encryption policy 132 can require the UEM agent 145 to verify that the UEM service has accurately stored the removable drive recovery key 137 and other removable drive encryption data 153 prior to proceeding with encryption.

In step 415, the UEM agent 145 can transmit the removable drive encryption data 153 to the UEM service 120. The UEM agent 145 can transmit removable drive encryption data 153 in response to certain events associated with encryption, decryption, and access to encrypted removable drives 147. The events can include removable drive encryption as discussed in the preceding steps. The events can also include removable drive access, removable drive recovery request, receipt of a removable drive recovery key 137, successful access to a removable drive 147, and other events. The removable drive encryption data 153 can include a removable drive recovery key 137, a recovery key identifier 139, a user identifier of a user logged into the client device 106, an encryption time and date, a most recently seen time and date, a device identifier or device name of the removable drive 147, a capacity of the removable drive 147, an identifier of the client device 106 to which the removable drive 147 is connected, and other information.

In step 418, the UEM agent 145 can determine whether a matching removeable drive recovery key 137 is received from the UEM service 120. The UEM agent 145 can receive a recovery key verification message from the UEM service 120. The recovery key verification message can include the removable drive recovery key 137 and other removable drive encryption data 153. This enables the UEM service 120 and the UEM agent 145 to verify that the removable drive recovery key 137 and the other removable drive encryption data 153 is successfully received and stored by the UEM service 120 prior to removal from the client device 106.

If the removable drive recovery key 137 matches that stored in the client device 106, the process can move to step 421. Otherwise, the UEM agent 145 can retry the transmission process periodically and in response to certain events such as a detection that network connectivity is restored, a restart of the client device 106, and other events.

In step 421, the UEM agent 145 can delete the removeable drive recovery key 137 from the client device 106. In some cases, the UEM agent 145 transmits an indication that the removable drive recovery key 137 matches that stored in the client device 106 and the removable drive recovery key 137 is deleted from the client device 106. Removal of the removable drive recovery key 137 from the client device 106 can be a security feature. Multiple users may access a client device 106, or the client device 106 can be a user's personal device and can be subject to loss. Further, there is no expectation that a removable drive 147 is associated with a particular client device 106, even if the removable drive 147 is initially accessed and encrypted on that client device 106.

Figure 5:
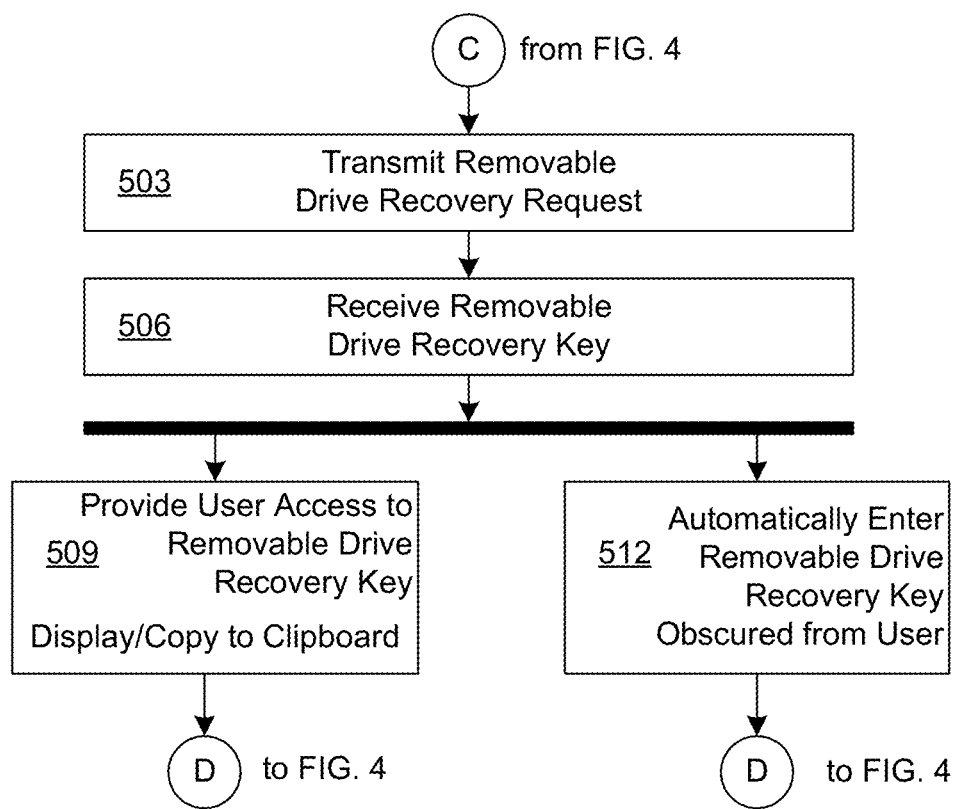
FIG. 5 illustrates another flowchart performed by components of the networked environment for secure recovery key management and removable drive encryption enforcement, according to various examples described herein.

FIG. 5 shows a flowchart performed by components of the networked environment 100. The flowchart illustrates how a UEM agent 145 can interact with other components of the networked environment 100 to provide secure recovery key management for removable drive encryption policy enforcement. Generally, the flowchart shows how the UEM agent 145 can facilitate removable drive 147 recovery in case of a lost or unknown removable drive password 151.

In step 503, the UEM agent 145 can transmit a removable drive recovery request. While a user can manually call or contact an administrator to request recovery, a UEM agent 145 can also facilitate this process. The UEM agent 145 can identify a predetermined number of password entry failures and can recommend or automatically transmit the removable drive recovery request. The UEM agent 145 can provide a user interface element that enables a user to initiate the removable drive recovery request.

In step 506, the UEM agent 145 can receive a removable drive recovery key 137 and potentially other removable drive encryption data 153 from the UEM service 120 for drive recovery. For example, the UEM service 120 can receive the removable drive recovery request and notify an administrative user to review the request, or a user of the removable drive 147 can contact the administrative user directly. In either case, the administrative user can identify the appropriate removable drive 147 within the console user interface, and can select a user interface element that causes the UEM service 120 to transmit the removable drive recovery key 137, and other removable drive encryption data 153 to the UEM agent 145.

Alternatively, the UEM agent 145 can invoke a self-service recovery key endpoint such as an application programming interface exposed by the UEM service 120, and the UEM service 120 can return the removable drive recovery key 137 to the UEM agent 145. The UEM agent 145 can invoke the self-service recovery key endpoint using parameters including the recovery key identifier 139, and the user identifier of a user or operator of the removable drive 147.

Once the UEM agent 145 obtains the removable drive recovery key 137, the UEM agent 145 can use the removable drive recovery key 137 in a number of ways according to the removable drive encryption policy 132. The UEM agent 145 can transmit removable drive encryption data 153 that specifies events associated with the recovery process.

In step 509, the UEM agent 145 can provide end-user access to the removable drive recovery key 137. For example, the UEM agent 145 can display the removable drive recovery key 137, copy it to a clipboard of the client device 106, or otherwise provide user access. This can enable the user to manually perform the recovery process using the recovery user interface 165 of the operating system 143. The UEM agent 145 can transmit an indication of success or failure for the recovery process to the UEM service 120.

In step 512, the UEM agent 145 can also automatically enter the removable drive recovery key 137 in a manner that remains obscured from the user. For example, the UEM agent 145 can generate and transmit commands that direct the operating system 143 to perform the recovery process off-screen so that the removable drive recovery key 137 remains obscured and inaccessible to the user. This can include providing the recovery key identifier 139, the removable drive recovery key 137, and other information to the operating system 143. The UEM agent 145 can transmit an indication of success or failure for the recovery process to the UEM service 120.

Figures 6A, 6B:
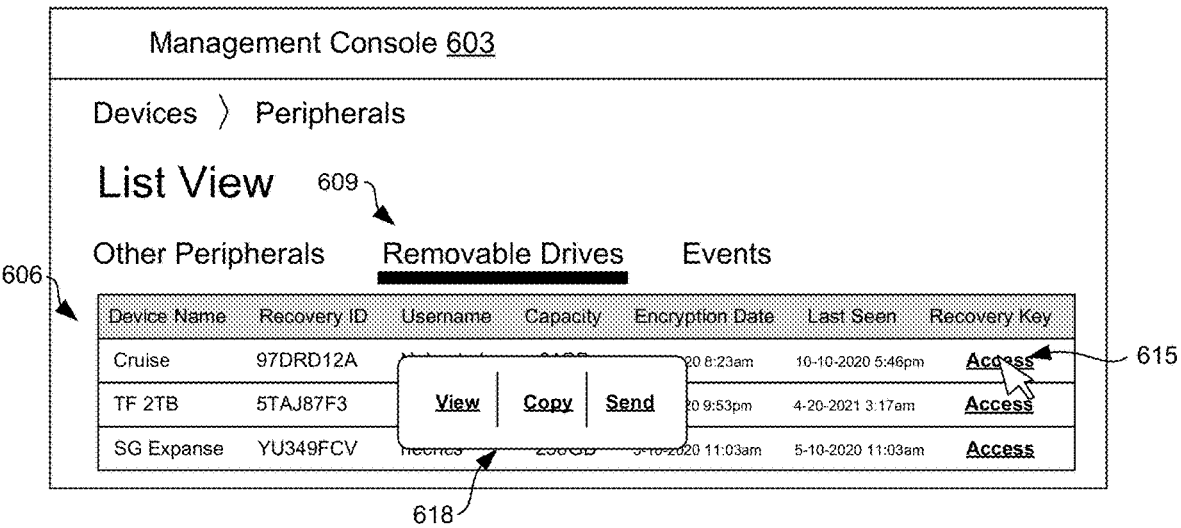
FIGS. 6A and 6B illustrate example user interfaces for secure recovery key management and removable drive encryption enforcement, according to various examples described herein.

FIG. 6A shows an example management console 603 of the UEM service 120. The management console 603 can include a device table or other user interface area 606 that shows information for removable drives 147 that are managed by the UEM service 120. The management console 603 can show the user interface area 606 in response to a user selection of the "removable drives" user interface element 609. The management console 603 of the UEM service 120 can alternatively identify a user account, and list all removable drives 147 that list that user account as the owner or operator.

The user interface area 606 can be searchable and filterable according to any of the columns shown, including device name or identifier, recovery key identifier 139, username or user identifier, removable drive 147 capacity, encryption date, last seen, as well as according to other information, such as most recently connected client device 106, and initial encryption client device 106. All or a subset of this information can be stored in the removable drive recovery key escrow 135.

The user interface area 606 can maintain the removable drive recovery keys 137 obscured from view, and can instead provide a user interface element 615 that can be selected to reveal a removable drive recovery key 137. The management console 603 can provide the user interface element 615 in order to require a specific user request in order to view, access, or provide access to the removable drive recovery key 137. This can minimize inadvertent exposure to removable drive recovery keys 137 and can also provide audit trail that includes list of users and devices that have accessed or have been exposed to removable drive recovery keys 137. The console user interface 618 can also indicate that a selection of the user interface element 615 (or the user interface 618) to view, copy, transmit, or otherwise access the removable drive recovery key 137 can result in their username or user identifier being logged.

The management console 603 can generate a user interface element 618 in response to a user selection of the user interface element 615. The user interface element 618 can show the removable drive recovery key 137, or can maintain the removable drive recovery keys 137 obscured. The user interface element 618 can also include one or more user-selectable access options. Here, the user interface elements 618 can provide a respective button or user interface element for view, copy, and send options. The view option can reveal the removable drive recovery key 137 within the management console 603. The copy option can copy the removable drive recovery key 137 to a clipboard of the client device 106 through which the management console 603 is accessed. The send option can transmit the removable drive recovery key 137 to a client device 106 associated with the removable drive 147 or a particular user as discussed above. In some examples, the management console 603 can provide a user interface element to select from a number of client devices 106 that are associated with the removable drive 147 or a particular user.

FIG. 6B shows another example of the management console 603 of the UEM service 120. The management console 603 can include an event table or other user interface area 618 that shows information for events logged in association with removable drives 147 that are managed by the UEM service 120. The management console 603 can show the user interface area 618 in response to a user selection of the "events" user interface element 624.

The user interface area 618 can be searchable and filterable according to any of the columns shown, including device name or identifier, recover key identifier 139, username or user identifier, event or event type, event date, as well as according to other information that can be shown such as removable drive 147 capacity, encryption date, last seen, most recently connected client device 106, initial encryption client device 106. All or a subset of this information can be stored in the removable drive recovery key escrow 135.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The cloud computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the UEM service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The UEM service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the UEM service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method, comprising:
   transmitting, by a management service, a removable drive encryption policy to a client device, wherein the removable drive encryption policy causes a management service agent running on the client device to:
   intercept launch of a first encryption user interface by an operating system of the client device;
   generate a second encryption user interface that obscures removable drive recovery keys for removable drives accessed using the client device from view; and
   enforce the operating system of the client device to perform volume encryption for the removable drives accessed using the client device;
   receiving, by the management service, removable drive encryption data for a removable drive connected to the client device, the removable drive encryption data comprising: a removable drive recovery key, a recovery key identifier, and a removable drive identifier;
   storing, by the management service, the removable drive encryption data within a removable drive recovery key escrow of the management service;
   transmitting, by the management service, a recovery key verification message to the client device to which the removable drive is connected, the recovery key verification message comprising the removable drive recovery key stored in the removable drive recovery key escrow, wherein the recovery key verification message causes the management service agent running on the client device to:
   determine whether the removable drive recovery key included in the recovery key verification message matches a removable drive recovery key stored on the client device, to verify that the removable drive recovery key in the removable drive encryption data has been successfully stored by the removable drive recovery key escrow; and
   upon determining that the removable drive recovery key included in the recovery key verification message matches the removable drive recovery key stored on the client device, delete the removable drive recovery key stored on the client device from the client device; and
receiving, in response to the recovery key verification message and from the management service agent running on the client device, an indication that the removable drive recovery key included in the recovery key verification message matches the removable drive recovery key stored on the client device and an indication that the removable drive recovery key stored on the client device has been deleted from the client device.

2. The method according to claim 1, wherein the removable drive recovery key escrow comprises recovery keys that are exclusively removable drive recovery keys for removable drives managed by the management service.

3. The method according to claim 1, further comprising:
   generating, by the management service, a third user interface that shows at least a subset of the removable drive encryption data, wherein the user interface obscures the removable drive recovery key from view.

4. The method according to claim 3, wherein the third user interface further comprises a user interface element that reveals the removable drive recovery key based on a user selection of the user interface element, and wherein the management service logs a recovery key access event along with a user identifier of a user that performs the user selection.

5. The method according to claim 3, wherein the third user interface further comprises a user interface element that causes the management service to transmit the removable drive recovery key to a client device identified based on a user account associated with the removable drive.

6. The method according to claim 5, wherein the management service transmits the removable drive recovery key to the client device using at least one of: an email message, a messaging service message, a short message service message, and a communication with a management agent executed on the client device.

7. The method according to claim 1, wherein
the removable drive encryption policy also causes the management service agent running on the client device to:
   prevent printing and displaying of the removable drive recovery keys for removable drives, and prevent saving of the removable drive recovery keys for removable drives to an operation-system-affiliated account; and
   enforce a removable drive to be used in read-only mode upon the volume encryption is cancelled or declined with respect to the removable drive.

8. A non-transitory computer-readable medium embodying instructions executable by at least one computing device, the instructions, when executed, causing the at least one computing device to at least:
   transmit, by a management service, a removable drive encryption policy to a client device, wherein the removable drive encryption policy causes a management service agent running on the client device to:
      intercept launch of a first encryption user interface by an operating system of the client device;
      generate a second encryption user interface that obscures removable drive recovery keys for removable drives accessed using the client device from view; and
      enforce the operating system of the client device to perform volume encryption for the removable drives accessed using the client device;
   receive, by the management service, removable drive encryption data for a removable drive connected to the client device, the removable drive encryption data comprising: a removable drive recovery key, a recovery key identifier, and a removable drive identifier;
   store, by the management service, the removable drive encryption data within a removable drive recovery key escrow of the management service;
   transmit, by the management service, a recovery key verification message to the client device to which the removable drive is connected, the recovery key verification message comprising the removable drive recovery key stored in the removable drive recovery key wherein the recovery key verification message causes the client device to:
      determine whether the removable drive recovery key included in the recovery key verification message matches a removable drive recovery key stored on the client device, to verify that the removable drive recovery key in the removable drive encryption data has been successfully stored by the removable drive recovery key escrow; and
      upon determining that the removable drive recovery key included in the recovery key verification message matches the removable drive recovery key stored on the client device, delete the removable drive recovery key stored on the client device from the client device; and
   receive, in response to the recovery key verification message and from the management service agent running on the client device, an indication that the removable drive recovery key included in the recovery key verification message matches the removable drive recovery key stored on the client device and an indication that the removable drive recovery key stored on the client device has been deleted from the client device.

9. The non-transitory computer-readable medium according to claim 8, wherein the removable drive recovery key escrow comprises recovery keys that are exclusively removable drive recovery keys for removable drives managed by the management service.

10. The non-transitory computer-readable medium according to claim 8, wherein the instructions further cause the at least one computing device to at least:
   generate, by the management service, a third user interface that shows at least a subset of the removable drive encryption data, wherein the user interface obscures the removable drive recovery key from view.

11. The non-transitory computer-readable medium according to claim 10, wherein the third user interface further comprises a user interface element that reveals the removable drive recovery key based on a user selection of the user interface element, and wherein the management service logs a recovery key access event along with a user identifier of a user that performs the user selection.

12. The non-transitory computer-readable medium according to claim 10, wherein the third user interface further comprises a user interface element that causes the management service to transmit the removable drive recovery key to a client device identified based on a user account associated with the removable drive.

13. The non-transitory computer-readable medium according to claim 12, wherein the management service transmits the removable drive recovery key to the client device using at least one of: an email message, a messaging service message, a short message service message, and a communication with a management agent executed on the client device.

14. The non-transitory computer-readable medium according to claim 8, wherein the removable drive encryption policy also causes the management service agent running on the client device to:
   prevent printing and displaying of the removable drive recovery keys for removable drives, and prevent saving of the removable drive recovery keys for removable drives to an operation-system-affiliated account; and
   enforce a removable drive to be used in read-only mode upon the volume encryption is cancelled or declined with respect to the removable drive.

15. A system, comprising:
   at least one computing device; and
   instructions accessible by the at least one computing device, wherein the instructions, when executed, cause the at least one computing device to at least:
      transmit, by a management service, a removable drive encryption policy to a client device, wherein the removable drive encryption policy causes a management service agent running on the client device to:
         intercept launch of a first encryption user interface by an operating system of the client device;
         generate a second encryption user interface that obscures removable drive recovery keys for removable drives accessed using the client device from view; and
         enforce the operating system of the client device to perform volume encryption for the removable drives accessed using the at least one client device;
      receive, by the management service, removable drive encryption data for a removable drive connected to a client device, the removable drive encryption data comprising: a removable drive recovery key, a recovery key identifier, and a removable drive identifier;
      store, by the management service, the removable drive encryption data within a removable drive recovery key escrow of the management service;
      transmit, by the management service, a recovery key verification message to the client device to which the removable drive is connected, the recovery key verification message comprising the removable drive recovery key stored in the removable drive recovery key escrow, wherein the recovery key verification message causes the client device to:
         determine whether the removable drive recovery key included in the recovery key verification message matches a removable drive recovery key stored on the client device, to verify that the removable drive recovery key in the removable drive encryption data has been successfully stored by the removable drive recovery key escrow, and
         upon determining that the removable drive recovery key included in the recovery key verification message matches the removable drive recovery key stored on the client device, delete the removable drive recovery key stored on the client device from the client device; and
      receive, in response to the recovery key verification message and from the management service agent running on the client device, an indication that the removable drive recovery key included in the recovery key verification message matches the removable drive recovery key stored on the client device and an indication that the removable drive recovery key stored on the client device has been deleted from the client device.

16. The system according to claim 15, wherein the removable drive recovery key escrow comprises recovery keys that are exclusively removable drive recovery keys for removable drives managed by the management service.

17. The system according to claim 15, wherein the instructions further cause the at least one computing device to at least:
   generate, by the management service, a third user interface that shows at least a subset of the removable drive encryption data, wherein the user interface obscures the removable drive recovery key from view.

18. The system according to claim 17, wherein the third user interface further comprises a user interface element that reveals the removable drive recovery key based on a user selection of the user interface element, and wherein the management service logs a recovery key access event along with a user identifier of a user that performs the user selection.

19. The system according to claim 17, wherein the third user interface further comprises a user interface element that causes the management service to transmit the removable drive recovery key to a client device identified based on a user account associated with the removable drive.

20. The system according to claim 15, wherein the removable drive encryption policy also causes the management service agent running on the client device to:
   prevent printing and displaying of the removable drive recovery keys for removable drives, and prevent saving of the removable drive recovery keys for removable drives to an operation-system-affiliated account; and
   enforce a removable drive to be used in read-only mode upon the volume encryption is cancelled or declined with respect to the removable drive.

\* \* \* \* \*